2,914,496
Patented Nov. 24, 1959

2,914,496
CHLOROSULFONATED POLYETHYLENE COMPOSITION

Douglas J. Kelly, Wilmington, Del., assignor to E. I. du Pont de Nemours and Company, Wilmington, Del., a corporation of Delaware No Drawing. Application December 4, 1957
Serial No. 700,559

4 Claims. (Cl. 260—23)

This invention is directed to novel chlorosulfonated polyethylene elastomers and more particularly to a process for curing them, especially applicable to their use as coating compositions.

It is known that the chlorosulfonated polyethylenes may be cured, that is, made to lose their plasticity and solubility in organic solvents and to acquire elasticity, high tensile strength, and other rubber-like properties, by heating with certain metal oxides or salts as in U.S. Patents 2,416,060 and 2,416,061, or by heating with certain diamines, such as benzidine and anisidine, as in U.S. Patent 2,723,257. The cures obtained by the first method, although having satisfactory physical properties, have the limitation that the metal oxides, typically litharge and magnesium oxide, are required in large amounts and make it impossible to get transparent products. Benzidine and the like are capable of giving transparent cures which, however, have a rather limited application, particularly in coating compositions, because they require temperatures above 100° C. for curing and also because of their possible physiological effects.

It has been discovered that chlorosulfonated polyethylenes may be cured to transparent films and other articles, at room temperature, by the use of a composition of the present invention.

It is an object of the present invention to prepare curable chlorosulfonated polyethylene compositions of high elasticity, tensile strength, and a significant transparency in addition to having other desirable rubber-like properties. It is a further object of the present invention to prepare curable chlorosulfonated polyethylene compositions which may be utilized in coating at room temperatures.

These and other objects will become apparent in the following description and claims.

More specifically, the present invention is directed to a curable composition comprising a chlorosulfonated polyethylene elastomer (containing about 25 to about 50% chlorine and about 0.4 to about 3.0% sulfur) and a polyamide condensation product of a dimerized drying oil acid and an aliphatic diamine, said polyamide containing free amino groups giving it an amine value between 50 and 250 and said polyamide being present in the composition to the extent of 0.1 to 1.0 milliequivalents per gram of the elastomer.

The polyamides used to cure the chlorosulfonated polyolefin elastomers, according to the present invention, use as starting materials a dibasic acid (or mixture of dibasic acids) obtained by heating and dimerizing the unsaturated long-chain acids conveniently obtained from drying and semi-drying oils such as soy bean, corn, linseed, tung, and perilla oils. These dimers are heated with an excess of an aliphatic primary diamine such as ethylene diamine, hexamethylene diamine, and tetramethylene diamine, so that the final product has the general formula $$H_2N-R-NH(CO-R'-CONH-R-NH)_nH$$

in which R is the divalent aliphatic radical corresponding to the diamine used, R' is the divalent aliphatic hydrocarbon radical of the dibasic acid and $n$ is a small whole number, usually less than 6. The preparation and structures of these compounds is discussed in 2,379,413 and 2,450,940. These products are, in general, tacky resins or very viscous liquids, and are usually mixtures of two or more compounds of the above formula, characterized chemically by their amine value (analogous to acid value) which is defined as the number of milligrams of potassium hydroxide equivalent to one gram of resin. Thus, the higher the amine value, the lower is the average molecular weight. It is assumed that only the terminal —$NH_2$ groups contribute to the amine value. The amine value, divided by 56, gives the number of milliequivalents corresponding to one gram of the polyamide.

The chlorosulfonated polyethylene which may be cured according to the present invention may be made from any solid polyethylene and may contain from about 25 to about 50% chlorine and from about 0.4 to about 3.0% sulfur. Preferably it will contain 28–30% chlorine and 1.00 to 1.50% sulfur. Assuming that all the sulfur is present in —$SO_2Cl$ groups, the sulfur content (in milligrams) divided by 32 gives the number of milliequivalents based on the reactive —$SO_2Cl$ groups, corresponding to one gram of elastomer.

It is assumed, for the purpose of calculating the amount of polyamide to be used for curing, without rigorously establishing a mechanism for the reaction, that each —$SO_2Cl$ group in the elastomer is capable of reacting with one of the two terminal —$NH_2$ groups of the polyamide curing agent and that the extent of the cure depends on the extent to which the elastomer chains are crosslinked by this process. The amount of polyamide curing agent used is accordingly often that calculated to react completely with the chlorosulfonated polyethylene according to this mechanism. Thus in Example 3, the elastomer contained 1.25% sulfur or 0.39 milliequivalents of —$SO_2Cl$ per gram. The polyamide (amine value about 88) contained 1.56 milliequivalents of —$NH_2$ per gram. The 100 grams of elastomer and 25 grams of polyamide used therefor each corresponded to 39 milliequivalents. In other words, stoichiometric amounts were used. Comparison with Examples 1 and 2 using less curing agent and with Example 4 using more curing agent with the same chlorosulfonated polyethylene shows that the best properties were in general obtained when this stoichiometric quantity was used, although the quantities are not sharply critical. When the elastomer contains much smaller amounts of sulfur, however, it may be desirable to use an excess of the reagent to assure complete reaction and in the case of chlorosulfonated polyethylene containing much more sulfur, on the other hand, it may be desirable to moderate the cure by using much less than the theoretical quantity.

Because of the comparatively rapid reaction of the polyamide curing agents, they are particularly suitable for preparing coating and other film-forming compositions, in which, for example, the chlorosulfonated polyethylene and the curing agents are mixed in solution, the solution is applied, the solvent is evaporated, and the elastomer and curing agent then react in concentrated form, with curing then taking place rapidly, even at room temperature. In making these coating compositions, aromatic hydrocarbons are usually used as the principal solvents. Benzene, toluene, and xylene, for example, may be used, depending on the volatility desired. In making the separate solution of the polyamide, solubility is improved by alcohols such as isopropyl and butyl alcohols and glycol monoethyl ethers and by ketones such as methyl ethyl ketone. Butyl alcohol is preferred because of its stabilizing against gelling.

The following representative examples illustrate the present invention:

Examples

A commercial chlorosulfonated polyethylene containing about 29% chlorine and 1.25% sulfur in the form of sulfone chloride groups ($-SO_2Cl$) was dissolved in toluene to give a 20% solution. To this was added varying amounts of a 50% solution of the condensation product of a fatty acid dimer and an aliphatic diamine described above, dissolved in a mixture of equal amounts of xylene and butanol. The condensation product used in many of the examples (1-4) was a product known as Versamid 100, sold by General Mills, Inc., and having an amine value of 83-93, a melting point of 43-53° C. and a Brookfield viscosity of 10-15 poises at 150° C. It is believed to be essentially the condensation product of two mols of the dimer of linoleic acid with approximately 3 mols of ethylene diamine, with terminal $-NH_2$ groups, amounting to about 0.00157 equivalent per gram. Mixtures of the two solutions were made so as to give 15, 20, 25, and 30 parts of the condensation product per 100 of the chlorosulfonated polyethylene. Films corresponding to these compositions were prepared by evaporating the solvent and were tested after various aging periods at room temperature and 140° C. Results are shown in the following table. The films were all very clear and light colored. The mixed solutions of elastomer and curing agent could be stored for 1 to 2 weeks before gelation occurred.

The condensation product used in Examples 1-4 is known as "Versamide 100," more particularly described with other "Versamides," which may be utilized according to the present invention, as set forth in Technical Bulletin 11A "Versamides" Versatile Polyamide Resins by General Mills, Inc., and copyrighted in 1955.

| Example No. | 1 | 2 | 3 | 4 |
|---|---|---|---|---|
| Condensation product per 100 chlorosulfonated polyethylene | 15 | 20 | 25 | 30 |
| Amine equivalents | 0.023 | 0.031 | 0.039 | 0.047 |
| 6 Days at room temperature: | | | | |
| Tensile strength, p.s.i. | 675 | 1,040 | 1,200 | |
| Elongation at break, percent | 1,300 | 1,000 | 900 | |
| Permanent set at break, percent | 85 | 45 | 35 | |
| 28 Days at room temperature: | | | | |
| Tensile strength, p.s.i. | 1,025 | 1,450 | 1,475 | 850 |
| Elongation at break, percent | 1,200 | 890 | 440 | 860 |
| Permanent set at break, percent | 43 | 25 | 20 | 35 |
| Water pick-up,[1] Percent | 51 | 37 | 32 | 33 |
| 15 Minutes at 140° C.: | | | | |
| Tensile strength, p.s.i. | 1,125 | 1,425 | 1,025 | |
| Elongation at break, percent | 1,100 | 900 | 640 | |
| Permanent set at break, percent | | | 30 | 26 |
| Water pick-up,[1] percent | | 50 | 24 | 29 |

[1] Percent weight increase of sample after 7 days in water at 70° C.

It will be seen from this table that these compositions, particularly those containing 20 and 25 parts of the condensation product, have moderately good tensile properties and that these are well developed simply by brief aging at room temperature. The room temperature cures at 28 days are comparable in all respects with those obtained at 140° C. In comparison with the aromatic diamines used in U.S. Patent 2,723,257, for which a curing temperature of at least about 100° C. is required, the present condensation product, particularly in the preferred amounts of 20 and 25 parts per 100, give, unexpectedly, comparable properties with only room temperature curing. These properties are also significantly comparable with those of the non-transparent cures obtained with agents such as litharge at a temperature around 140° C. according to U.S. Patent 2,416,060.

Example 5

Example 3 was repeated, using a diamine condensation product similar to that already described but with an amine value of 220, corresponding to about 4 milliequivalents per gram. Films were prepared immediately after mixing the solutions. Rapidly hardening films were obtained at room temperature. So rapid was the reaction of the curing agent with the elastomer that gelation of the mixed solutions occurred when allowed to stand for 20 minutes or more.

Example 6

Example 3 was repeated, incorporating a dispersion of 40 parts of barium sulfate and 40 parts of titanium dioxide. A pure white film with properties similar to those of Example 3 resulted.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A chlorosulfonated polyethylene composition curable at room-temperature, said chlorosulfonated polyethylene having from about 0.04 to about 3.0% sulfur and from about 25 to about 50% chlorine, said composition containing a polyamide condensation product of a dimerized drying oil acid and an aliphatic diamine, said polyamide containing free amino groups and having an amine value between 50 and 250, and, said polyamide being present in said composition to the extent of about 0.1 to 1.0 milliequivalent per gram of chlorosulfonated polyethylene.

2. The composition of claim 1 wherein the chlorosulfonated polyethylene contains from about 28 to about 30% chlorine and from about 1.0 to 1.5% sulfur.

3. The composition of claim 1 wherein the polyamide condensation product has an amine value between 83 and 93.

4. A chlorosulfonated polyethylene composition curable at room temperature, said chlorosulfonated polyethylene containing from about 28 to about 30% chlorine and from about 1.0 to about 1.5% sulfur, said curable composition containing a polyamide condensation product of a dimerized drying oil acid and an aliphatic diamine, said polyamide having an amine value between 83 and 93, and, said polyamide being present in said composition to the extent of 15-30 parts by weight per 100 parts of the chlorosulfonated polyethylene.

References Cited in the file of this patent
UNITED STATES PATENTS 2,646,422    Strain _____ July 21, 1953
2,678,287    Cupery et al. _____ May 11, 1954

OTHER REFERENCES

Swann; Modified Polyamide Resins, By Gum, p. 14-20, Sept.-Oct. 1956.